United States Patent [19]

Peterson

[11] 4,065,593
[45] Dec. 27, 1977

[54] SOLAR ENERGY ABSORBER

[75] Inventor: Albert Henry Peterson, Sandy, Utah

[73] Assignee: Hercules Incorporated, Wilmington, Del.

[21] Appl. No.: 677,093

[22] Filed: Apr. 14, 1976

[51] Int. Cl.² ............................................. B32B 3/02
[52] U.S. Cl. ........................................ 428/92; 428/95; 428/97; 428/367; 428/408; 428/913
[58] Field of Search ................... 428/85, 92, 95, 96, 428/97, 367, 408, 913; 126/270, 271; 136/206; 29/184, 191.6, 193, 193.5, 195; 60/641

[56] References Cited
PUBLICATIONS

Cuomo, Applied Physics Letters, vol. 26, No. 10, pp. 557–559, May 1975.

*Primary Examiner*—Marion E. McCamish
*Attorney, Agent, or Firm*—Michael B. Keehan

[57] ABSTRACT

A solar energy absorber is provided in which the absorber surface is comprised of a multiplicity of free ends of carbon or metallic fibers. The fibers forming the absorber surface are straight and are aligned in a parallel and side-by-side relationship. The small diameters of the fibers and the very close spacing of adjacent fibers of from 1 to about 10 micrometers provides a trap for solar energy. A solar energy absorbing device is also provided.

3 Claims, 4 Drawing Figures

SOLAR ENERGY ABSORBER

This invention relates to a device for absorbing solar energy and for conversion of solar energy to other useful forms of energy. More particularly, this invention relates to an improved solar energy absorber which is particularly suitable for use in applications where high temperatures are needed.

Solar energy absorbers are devices used to capture energy from the sun in the form of radiation and to convert this radiation into heat which can in turn be utilized for various purposes. Solar energy absorbers, sometimes referred to as solar collectors, may be used with or without radiation concentration.

Solar collectors are often categorized as either flat-plate collectors or concentrating collectors. Flat-plate collectors are usually, but not always, mounted in a stationary position with an orientation optimized for a particular location and for the time of year in which the solar device is intended to operate. Flat-plate collectors are usually housed within a thermally insulated flat box having a solar window of glass or plastic. The flat-plate collector surface is painted or treated to produce a blackened surface for radiation absorption. A heat absorbing fluid is generally pumped through tubing provided in the interior of the housing for the flat-plate collector to absorb heat from the collector surface.

The flat-plate collector is mechanically simpler than the focusing collector. The focusing collector is comprised of a concentrating reflector, absorbing surface, and orientation device. A typical concentrating reflector is a parabolic mirror. The absorbing surface can be a long coil housed in the center of the area defined by the parabolic mirror. The orientation device is a mechanical means for moving the parabolic mirror-absorber combination in the direction of sunlight during the course of the day.

Flat-plate collectors are designed for applications requiring energy delivery at moderate temperatures, i.e., up to about 250° F. Focusing collectors are used principally for applications requiring delivery of energy at higher temperatures, say above about 250° F.

The solar energy absorber of this invention is particularly suitable for use for delivery of energy at high temperatures. At high temperature applications (above 250° F.) the solar energy absorber of this invention has a high efficiency of energy absorption. The solar energy absorber of this invention can be manufactured at a reasonable cost and the absorber surface is substantially reproducible.

Broadly, in accordance with this invention, a solar energy absorber is provided comprising a multiplicity of fibers selected from carbon fibers and metal fibers, said carbon fibers having diameters of from about 4 micrometers to about 12 micrometers and said metal fibers having diameters of from about 4 micrometers to about 100 micrometers, said fibers being substantially straight and aligned in parallel and side-by-side relationship, substantially all of said fibers having at least one free end, the free ends of said fibers comprising the solar energy absorbing surface, said fibers being spaced apart such that the distance between adjacent fibers is from about 1 micrometer to about 20 micrometers.

The solar energy absorber of this invention is more fully described by reference to the drawings.

Figure 1:
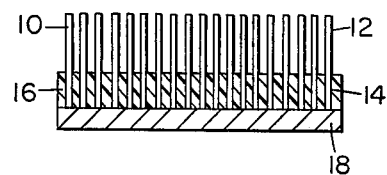
FIG. 1 is a schematic drawing illustrating a simple embodiment of the solar energy absorber of this invention.

In FIG. 1 a solar energy absorber of this invention is illustrated in which a multiplicity of fibers 10, which are substantially straight, are aligned in a parallel and side-by-side relationship. The fibers illustrated each have one free end 12 and a fixed end 14 embedded in a substrate 16. The free ends of the fibers 10 comprise the solar energy absorbing surface. In the embodiment illustrated, a thermal conductor 18 is adhesively secured to the base of substrate 16.

Figure 2:
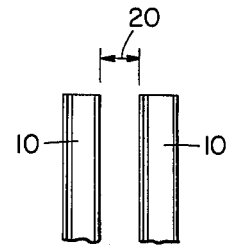
FIG. 2 is a schematic enlargement of adjacent fibers illustrating the special relationship of the fibers within the solar energy absorber.

In FIG. 2 a schematic illustrating two adjacent fibers of the solar energy absorber surface is depicted. It can be seen from this schematic that the free ends of the fibers are straight and aligned in a parallel and side-by-side relationship. The space 20 between the adjacent fibers is minute, on the order of about 1 to about 20 micrometers and preferably from about 1 to about 4 micrometers.

Figure 3:
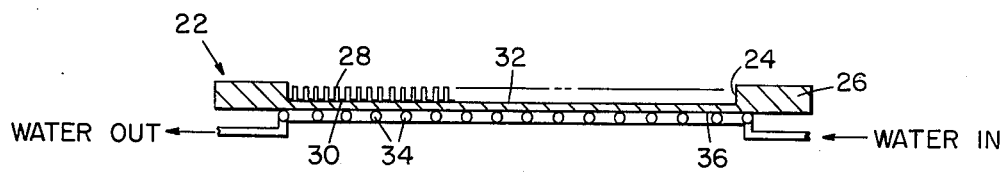
FIG. 3 is an illustration of a solar energy absorbing device which comprises a solar energy absorber, a heat conducting means in communication with said absorber, and means for transferring the thermal energy absorbed by the heat conducting means into a working fluid.

In FIG. 3 an embodiment of the solar energy absorber device of this invention is illustrated. In this device a solar energy absorber 22 is inserted into a cavity 24 in brass plate 26. The free ends 28 of the fibers in the absorber 22 form the energy collecting surface and the opposite ends of the fibers are embedded in a matrix, which combination of fibers and matrix forms the base 30 of the absorber. The base 30 of the absorber 22 is bonded through an adhesive to the surface 32 of brass plate 26 formed by the cavity 24 in the brass plate 26. A copper coil 34 is bonded to the base 36 of the brass plate 26 by any suitable means such as by silver solder. This coil 34 has an inlet and an outlet for working fluid which passes through the coil and absorbs the heat transferred from the absorber 22 to the brass plate 26. The rate of flow of working fluid through the coil 34 can be controlled such that the working fluid is heated to a desired temperature within the limits imposed by the efficiency of the absorber, by the concentration of solar energy impinging on the absorber collecting surface and by the efficiency of the absorber device. Working fluids having moderate boiling points can be converted to gases in the solar energy absorber device of this invention, which gases can be used to generate mechanical power or electrical power. The working fluid flowing through the coil can also be pressurized by any suitable means, such as a pump.

Figure 4:
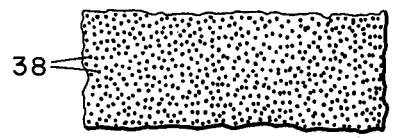
FIG. 4 is a schematic enlargement of the surface of a carbon fiber solar energy absorber of this invention.

FIG. 4 is a schematic enlargement of a top view of a solar energy device of this invention prepared from carbon fiber illustrating the spacing between and the individuality of substantially all of the free ends of the fibers 38 which comprise the solar energy absorbing surface.

In the solar energy absorber of this invention carbon fibers or metal fibers are arranged to provide a geometry capable of absorbing solar radiation. The term "carbon fibers" is used in this invention in its generic sense and is intended to include both carbon fibers and graphite fibers. Such fibers can be made by processes known in the art such as the process described in U.S. Pat. No. 3,412,062. Carbon fibers used in this invention can be prepared from a large number of precursor materials such a polyacrylonitrile, rayon, pitch, and the like. Carbon fibers are dark in color, usually black, and can be employed in the solar energy absorber of this invention without further treatment. Metal fibers which can be employed in the solar energy absorber of this invention include any metals that can be drawn into a fiber having a diameter of less than 100 micrometers. Illustrative metals which can be employed include steel, copper, copper alloys, aluminum, tin, silver, and the like. The metal fibers can be treated by any suitable means to darken or blacken the metal, and thereby increase emissivity of the energy absorbing surface. The preferred fiber for use in preparing the solar energy absorber of this invention is carbon fiber. A principal advantage of the use of carbon fiber is its high thermal conductivity.

In the solar energy absorber of this invention the fibers must be substantially straight and aligned in a parallel and side-by-side relationship. Alignment can be achieved by any suitable method. Particularly suitable methods are pultrusion and filament winding. In pultrusion the fibers are pulled through a die while the fibers are in contact with a thermoplastic or thermosetting resin, with a molten metal matrix or with a metal filled resinous matrix such as an epoxy matrix containing particulate metals such as aluminum, under conditions such that the resulting fiber composite exiting the die is self-supporting, i.e., retains its basic shape after exiting from the die. The resulting composite is rod-like in form. The composite is permitted to harden and is cut perpendicular to the longitudinal axis of the rod to desired lengths. When preparing large solar energy absorbers, the small sections of the composite can be assembled, for example, like pieces of tiles, to form a large absorber surface. Preparation of composites by pultrusion results in fibers which are substantially straight and aligned in a parallel and side-by-side relationship. After cutting of the solar absorber sections, the matrix surrounding the fibers is removed from at least one end of the composite by any means which is suitable, dependent upon the composition of the matrix. Thus, the matrix can be removed by various means such as by burning, by controlled solvation of matrix, by melting, and the like. Sufficient matrix must be removed from one surface of the composite such that the individual fibers at one surface of the composite are substantially free and spaced apart so that the minimum distance between adjacent parallel fibers is from about 1 micrometer to about 20 micrometers and preferably from about 1 micrometer to about 10 micrometers. The free, aligned ends of the fiber form the solar energy collecting surface. If desired, substantially all of the matrix can be removed from the composite. It has been found that even though substantially all the resin is removed from the composite, the aligned fibers will retain their position relative to each other in the absorber if handled carefully.

Another method for preparation of the solar energy absorber of this invention is filament winding of the fiber around a mandrel which provides for level winding such that the fibers are substantially straight and are aligned in a parallel and side-by-side relationship. In this process fibers are wound by known methods. For example, the fibers can be passed through a resin bath prior to being wound or the resin can be applied by other methods, such as by spraying of the fiber with resin during the winding operation. The resin-wet structure is cured when the resin employed is thermosetting and is cooled when the resin employed is thermoplastic to form a solid composite structure. Sections can be cut from the level wound portion of the resulting composite and the resin can be removed by methods heretofore described. The resulting fibers can be bonded to a heat conducting surface by any suitable means or the fibers can be packed into pockets or cavities in a heat conductive block so that the fibers are in communication with the block. The solar energy absorbed by the absorber is converted to heat and the absorbed heat is transferred through any suitable heat conducting means to perform work.

Fibers employed in the solar absorber of this invention can be embedded directly in a heat conducting metal or metal alloy which in turn is bonded to or forms part of a heat conducting block. This type of bonding is preferred to achieve the most efficient heat transfer from the fibers. In the case of carbon fibers, the fibers can be embedded in metal by a process described as follows. First, the fibers are aligned in a parallel and side-by-side relationship in a composite structure as heretofore described. The resin is then substantially completely removed from the composite structure by burning the resin from the structure. The fibers remain aligned even though the resin is substantially completely removed. One end of the fibers comprising the surface of the solar absorber can be coated with up to about 1000 angstroms of titanium boride, titanium carbide, or a mixture thereof. The coated ends of the carbon fibers are dipped into a bath of molten metal or metal alloy, and the fibers are then removed from the bath and allowed to cool. A solid metal matrix is formed in which one end of each of the carbon fibers is encapsulated in metal and the opposite ends of the fibers is free and functions as the solar energy absorbing surface hereinfore described. For a description of a process of forming a carbon fiber-metal composite see U.S. Pat. No. 3,894,863; reference to which is hereby made. Metal fibers can be bonded to metal by any suitable bonding technique which depends on the particular metal fiber being employed. Methods of bonding of metals to metals are well known in the art.

In the solar energy absorber of this invention the combination of the carbon fiber having diameters of from about 4 micrometers to about 12 micrometers or metal fibers having diameters of from about 4 micrometers to about 100 micrometers and the critical spacing betweem adjcent fibers provides an excellent surface wherein solar energy can be trapped, converted into heat, and used to perform work.

In assembly of the solar energy device of this invention, it is preferable and in some cases critical, to protect the solar energy absorbing surface from the natural elements, and, in particular, from air. In particular, where the solar energy absorber is subjected to concentrated solar energy through use of lenses and the like, high temperatures built up within the absorber can result in deterioration or destruction of the fibers in the absorber. This is particularly true in the case of carbon fibers. Thus, for use of the solar energy absorber at temperatures of about 450° F. and above, the absorber should be surrounded by a substantially inert atmosphere or maintained in a partial vacuum.

The following examples illustrate preparation of the solar energy absorber of this invention.

EXAMPLE 1

A solar absorber is prepared by initially filament winding of an NOL ring using carbon fiber. A transparent, clear polyester resin is employed in preparation of the filament wound ring. The filament wound ring is cured and ¼ inch thick by ¼ inch inch square sections are cut from the level wound section of the ring. The fibers in the level would sections are substantially straight and are in parallel and side-by-side relationship. Sixteen ¼ inch sections as described are cut from the filament would ring and assembled to prepare a 1 inch square absorber. The absorber is placed in a mold one inch deep by four inches in diameter containing uncured silicon rubber. The rubber is cured at ambient conditions and forms the insulator for the absorber. The resin matrix is partially removed from the surface of the absorber using an acetylene torch. The resin is removed to a depth of about 1/16 inch to about ⅛ inch. The resulting structure is a solar energy absorber of this invention.

Sunlight is concentrated through a 4½ inch convex lens toward the center of the solar absorber to a circular area ⅜ inch in diameter. A thermocouple is bonded to the base of the absorber. After exposure to the sunlight for 465 seconds, the temperature at the base of the absorber is measured and is 300° F. Sunlight is then concentrated on a one inch diameter area for 650 seconds using the 4½ inch convex lens. The temperature measured at the base of the absorber is 250° F.

EXAMPLE 2

A solar absorber 4 inches by 4 inches by ⅛ inch thick was prepared from carbon fiber following the process described in example 1. A solar energy absorber device was assembled as follows. A cavity 4 inches by 4 inches by 3/32 inch deep was milled into a brass plate 6 inches by 6 inches by ⅛ inch deep. Eleven feet of copper tubing was silver soldered to the base surface of the brass plate. The solar absorber was inserted into the cavity in the brass plate.

Sunlight is concentrated onto the surface of the solar absorber utilizing a 42 inch diameter parabolic mirror. The mirror concentrates the sunlight to a circle having a diameter of about 2¼ inches at the center of the absorber. Water is pressurized through a coil bonded to the heat conductor block which in turn is bonded to the solar energy absorber. The coil is made of copper and has an inside diameter of 3/32 of an inch and is eleven feet long. The copper coil is silver soldered to the base of the brass plate. The water in the coil is pressurized to 360 p.s.i.g. Sunlight is then concentrated on the surface of the absorber through the parabolic mirror. Results of this test are set forth in Table I.

Table I

| Inlet Water Temp. (° F.) | Outlet Water Temp. (° F.) | Water Flow Rate (lbm/hr) | Heat Absorbed by Water (BTU/hr) | Power from Sun (BTU/hr) | Ambient Temp. (° F.) |
|---|---|---|---|---|---|
| 55.4 | 381 | 2.50 | 828 | 1590 | 44.6 |
| 68.0 | 295 | 3.59 | 827 | 1470 | 51.8 |
| 66.2 | 244 | 3.79 | 686 | 1394 | 51.8 |

The solar energy absorber of this invention is useful in both a flat-plate solar collector and in a focusing collector. The solar absorber device of this invention is capable of delivery of energy at high temperatures as illustrated by the examples provided herein.

What I claim and desire to protect by Letters Patent is:

1. A solar energy absorber comprising a multiplicity of carbon fibers, said carbon fibers having diameters of from about 4 micrometers to about 12 micrometers, said fibers being substantially straight and aligned in parallel and side-by-side relationship, substantially all of said fibers having at least one free end, the free ends of said fibers comprising the solar energy absorbing surface, said fibers being spaced apart such that the distance between adjacent fibers is from about 1 micrometer to about 20 micrometers.

2. The solar energy absorber of claim 1 in which the space between adjacent fibers is from about 1 to about 10 micrometers.

3. A solar energy absorber device comprising
   a. a solar energy absorber comprising a multiplicity of carbon fibers, said carbon fibers having diameters of from about 4 micrometers to about 12 micrometers, said fibers being substantially straight and aligned in parallel and side-by-side relationship, substantially all of said fibers having at least one free end, said fibers being spaced apart such that the average distance between adjacent fibers is from about 1 micrometer to about 20 micrometers, and
   b. a heat conducting means in communication with said solar energy absorber for conducting heat therefrom to perform work.

* * * * *